US012681844B2

(12) United States Patent　　(10) Patent No.: US 12,681,844 B2

Hecht et al.　　(45) Date of Patent: Jul. 14, 2026

(54) SECURE AND SEAMLESS INJECTION OF SECRETS BASED ON EXECUTION DEBUGGING

(71) Applicant: CyberArk Software Ltd., Petach-Tikva (IL)

(72) Inventors: Asaf Hecht, Petach-Tikva (IL); Emmanuel Ouanounou, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 349 days.

(21) Appl. No.: 18/451,324

(22) Filed: Aug. 17, 2023

(65) Prior Publication Data

US 2025/0061053 A1　　Feb. 20, 2025

(51) Int. Cl.
　　*G06F 11/3698*　　(2025.01)
　　*G06F 8/71*　　(2018.01)
　　*G06F 9/455*　　(2018.01)

(52) U.S. Cl.
　　CPC ............ *G06F 11/3698* (2025.01); *G06F 8/71* (2013.01); *G06F 9/4552* (2013.01)

(58) Field of Classification Search
　　CPC ....... G06F 8/71; G06F 9/4552; G06F 11/3698
　　See application file for complete search history.

(56) References Cited

U.S. PATENT DOCUMENTS

| | | | | |
|---|---|---|---|---|
| 9,087,190 | B2 * | 7/2015 | Singh | ................. H04L 63/1425 |
| 9,563,754 | B2 * | 2/2017 | Colnot | ............... G06Q 20/3227 |
| 9,804,820 | B2 * | 10/2017 | Quast | ..................... G06Q 10/10 |
| 10,162,627 | B2 * | 12/2018 | Fojtik | ........................ G06F 8/71 |
| 11,336,697 | B2 * | 5/2022 | Brannon | ............. G06F 21/6245 |
| 2006/0026430 | A1 * | 2/2006 | Luo | ......................... G06F 21/16 |
| | | | | 713/181 |
| 2011/0276951 | A1 * | 11/2011 | Jain | ...................... G06F 11/301 |
| | | | | 718/1 |
| 2012/0131654 | A1 * | 5/2012 | Kavantzas | .............. G06F 21/44 |
| | | | | 726/6 |
| 2014/0095821 | A1 * | 4/2014 | Yang | .................... G06F 3/0619 |
| | | | | 711/162 |
| 2016/0359920 | A1 * | 12/2016 | Abuelsaad | ............ G06F 21/123 |
| 2017/0109542 | A1 * | 4/2017 | Kang | .................... G06F 21/602 |
| 2017/0351863 | A1 * | 12/2017 | Gargiulo | .............. H04W 12/35 |
| 2021/0336996 | A1 * | 10/2021 | Brannon | ............. G06F 21/6245 |
| 2024/0289490 | A1 * | 8/2024 | Cohen | ................... G06F 16/986 |

* cited by examiner

*Primary Examiner* — Douglas M Slachta

(74) *Attorney, Agent, or Firm* — FINNEGAN, HENDERSON, FARABOW, GARRETT & DUNNER, LLP

(57) ABSTRACT

Systems, methods, and apparatuses are disclosed for injecting secrets into a software instance environment. Techniques may include identifying code of an application from storage, analyzing the code to determine a secret associated with execution of the application, and monitoring the application running in one or more instances to determine a condition for the application to use the secret. Techniques may further include validating the condition for the application to use the secret based on an execution state of the application, and injecting the secret into the one or more instances, wherein the application can then access the secret and perform an operation using the secret in accordance with the determined condition.

34 Claims, 4 Drawing Sheets

400

Identify code of an application from storage ⟿ 410

Analyze the code to determine a secret associated with the execution of the application ⟿ 420

Monitor the application running in one or more instances to determine a condition for the application to use the secret ⟿ 430

Validate the condition for the application to use the secret based on an execution state of the application ⟿ 440

Inject the secret into the one or more instances ⟿ 450

100

140

150

130

132

IDE

131

Network
110

120

Secret
Injection Host

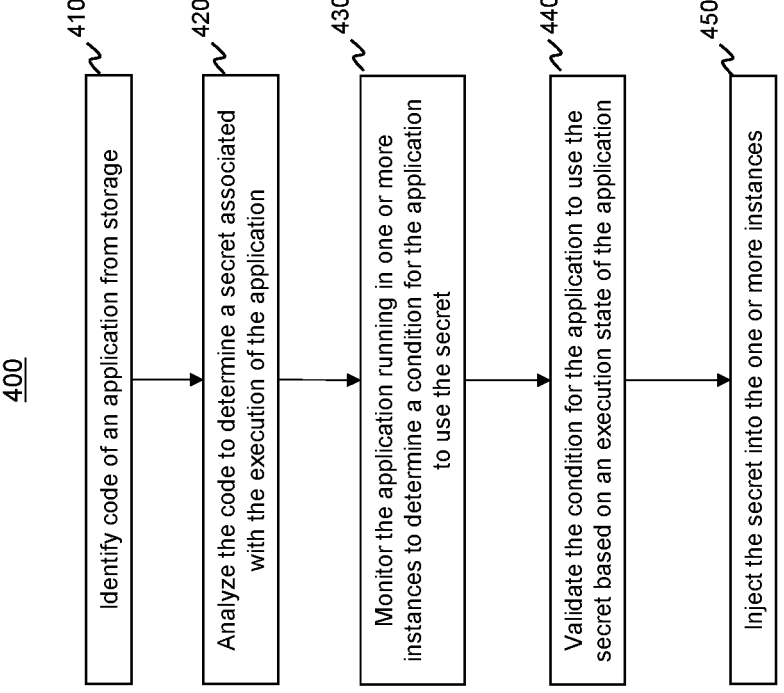

400

410 — Identify code of an application from storage

420 — Analyze the code to determine a secret associated with the execution of the application 430 — Monitor the application running in one or more instances to determine a condition for the application to use the secret 440 — Validate the condition for the application to use the secret based on an execution state of the application 450 — Inject the secret into the one or more instances

SECURE AND SEAMLESS INJECTION OF SECRETS BASED ON EXECUTION DEBUGGING

BACKGROUND

Modern software platforms employ various identification means in the form of secrets. Secrets may include passwords, usernames, Application Programming Interface (API) keys, database credentials, symmetric or asymmetric encryption keys, hash values, identity and access management (IAM) permissions, SSH keys, tokens, certificates, biometric data, personal data and other credentials. Secrets may commonly be used for managing access permissions at both human-to-application and application-to-application levels of interaction. When used appropriately, secrets may provide users and applications with access to sensitive data, systems, and services that are otherwise secured.

Secrets are widely used, inter alia, in modern DevOps systems. Secrets may be embedded as hard-coded credentials in containerized applications, automation processes, business-critical applications, security software (e.g., vulnerability scanners), application servers, IT management software, Robotic Process Automation (RPA) platforms, and Continuous Integration/Continuous Deployment (CI/CD) tool chains, etc.

Modern software platforms may employ software containers in cloud-based environments. Software containers may be packages that contain all the necessary elements to run an application in multiple operating system environments. Containers may virtualize the operating system and run from various locations, such as a private data center, the public cloud, or a personal computer. Containerization is an approach to software development in which an application or service, its dependencies, and its configuration are packaged together as a container image, allowing for easy deployment across environments with little or no modification. Containers may be executable units of software that package application code, libraries, and dependencies in common ways so that they can be run anywhere, leveraging the features and resources of the host operating system. Containers may be secured with secrets.

Malicious actors with access to a secret may gain real-time access and permissions to any resources belonging to the owner of the secret. Malicious actors may target secrets to gain unauthorized access to an application or resource, as well as additional secrets and hosts. Malicious actors may also impersonate legitimate pieces of code or applications to access secrets without permission.

Problems arise in securing software containers from malicious attacks. For example, a container may be comprised by an attacker or other malicious actor, and an application running inside a compromised container may request a secret from a secret management system, allowing the malicious actor to obtain the secret using the compromised container. An advanced attacker may impersonate an application with certain access keys running inside of a container and access the secrets. Similar problems may arise in virtual machine environments or serverless architectures, including when serverless functions run inside containers. Current security techniques may try to secure the secret management system or attempt to prevent malicious attackers from compromising containers in the first instance. But problems exist with these approaches and malicious actors conduct real attacks in the world that employ compromised containers.

Technological solutions are thus needed to secure application secrets if a host container, virtual machine, or serverless database is compromised. Such solutions should prevent malicious usage of secrets even if the container, virtual machine, or serverless database was totally compromised and the malicious actor tries to impersonate the running app inside. Such solutions should provide new and improved techniques for receiving secrets from secret management systems. Solutions should include techniques for identifying code of an application from storage and analyzing the code to determine a secret associated with execution of the application. Solutions should further include monitoring the application running in one or more instances or containers or virtual machines and validating a condition for the application to use the secret based on an execution state of the application. Solutions should also include injecting the secret into the one or more instances, wherein the application can then access the secret and perform an operation using the secret in accordance with the determined condition. These and other solutions may eliminate or reduce the ability for a compromised container, virtual machine, or serverless database to request hidden secrets for malicious purposes.

SUMMARY

The disclosed embodiments describe non-transitory computer readable media, systems, and methods for injecting secrets into a software instance environment. For example, in an embodiment, a computer-implemented method may include identifying code of an application from storage; analyzing the code to determine a secret associated with execution of the application; and monitoring the application running in one or more instances to determine a condition for the application to use the secret. The method may further include validating the condition for the application to use the secret based on an execution state of the application; and injecting the secret into the one or more instances, wherein the application can then access the secret and perform an operation using the secret in accordance with the determined condition.

Though reference is made herein to securing containerized environments, one of skill in the art will appreciate that the described non-transitory computer readable media, systems, and methods for injecting secrets are not limited to containerized environments and may also apply to virtual machines or serverless architecture environments including when serverless functions run inside containers.

According to a disclosed embodiment, analyzing the code to determine the secret associated with the application may include identifying a call associated with the secret. In another embodiment, analyzing the code to determine the secret associated with the application may include identifying a method of delivering the secret. In another embodiment, analyzing the code to determine the secret associated with the application may include analyzing an environmental variable. In yet another embodiment, analyzing the code to determine the secret associated with the application may include pre-approving code for execution.

According to a disclosed embodiment, monitoring the application may include debugging at least one line of code associated with the application. In another embodiment, monitoring the application further include comparing the debugged at least one line of code to pre-approved code. In an embodiment, the debugging may be performed by a host of the one or more instances. In yet another embodiment, the debugging may be performed with an extended Berkeley Packet Filter (eBPF).

According to a disclosed embodiment, monitoring the application may include evaluating at least one of metadata associated with the application, power consumption of hardware running the application, network traffic, or memory usage. In another embodiment, monitoring the application may include employing a machine learning algorithm to predict the execution state of the application corresponding to the determined condition.

According to a disclosed embodiment, determining the condition for the application to use the secret may include predicting an execution state where the application running in the one or more instances can use the secret.

According to a disclosed embodiment, validating the condition for the application to use the secret may include analyzing one or more lines of code associated with the execution state of the application. In another embodiment, validating the condition for the application to use the secret may include analyzing one or more lines of code associated with a subsequent execution state of the application.

According to a disclosed embodiment, the computer-implemented method may further include retrieving the secret from a secure location before injecting the secret into the one or more instances.

According to a disclosed embodiment, injecting the secret may include providing the secret based on an environmental variable. In an embodiment, the environmental variable may include at least one of a configuration file, an import file, or a request path. In another embodiment, injecting the secret may include replacing a dummy secret embedded in the application with a valid secret. In yet another embodiment, injecting the secret may include identifying a type and a consumption method of the secret by the application and injecting the secret in accordance with the type and the consumption method.

According to a disclosed embodiment, the computer-implemented method may further include verifying that the application running in the one or more instances used the secret according to the pre-approved code. In another embodiment, the computer-implemented method may further include removing the secret from the one or more instances after the application accesses the secret.

According to a disclosed embodiment, the computer-implemented method may further include revoking a permission associated with the secret after the application running in the one or more instances uses the secret.

According to a disclosed embodiment, injecting the secret may include providing the secret based on an environmental variable. In an embodiment, the environmental variable may include at least one of a configuration file, an import file, or a request path.

According to a disclosed embodiment, injecting the secret may further include identifying a type and a consumption method of the secret by the application and injecting the secret in accordance with the type and the consumption method.

According to a disclosed embodiment, the computer-implemented method may further include verifying that the application running in the one or more instances used the secret according to the pre-approved code.

According to a disclosed embodiment, the computer-implemented method may further comprise removing the secret from the one or more instances after the application accesses the secret. In another embodiment, the computer-implemented method may further comprise revoking a permission associated with the secret after the application running in the one or more instances uses the secret.

According to a disclosed embodiment, the application may be stored in the database in a continuous integration/continuous delivery (CI/CD) pipeline. In an embodiment, the application may be digitally signed in advance of its integration into the CI/CD pipeline.

According to a disclosed embodiment, a debugger for debugging the application may be hosted in a virtualized container. In an embodiment, the virtualized container hosting the debugger and the one or more instances running the application may be managed by a common instance management platform.

According to another disclosed embodiment, a non-transitory computer-readable medium may include instructions that, when executed by at least one processor, cause the at least one processor to perform operations for injecting secrets into a software instance environment, the operations comprising, identifying code of an application from storage, analyzing the code to determine a secret associated with execution of the application, and monitoring the application running in one or more instances to determine a condition for the application to use the secret. The operations may further comprise validating the condition for the application to use the secret based on an execution state of the application and injecting the secret into the one or more instances, wherein the application can then access the secret and perform an operation using the secret in accordance with the determined condition.

According to a disclosed embodiment, analyzing the code may include pre-approving code for execution, and validating the condition for the application to use the secret may include comparing the execution state of the application to the pre-approved code.

According to a disclosed embodiment, the operations may further comprise accessing a previous version of the application from storage and identifying a change to the application compared to the previous version of the application, wherein validating the condition for the application to use the secret may include analyzing the change to the application.

According to a disclosed embodiment, debugging the execution of the application may be performed from a host of the instance or in a layer of an extended Berkeley Packet Filter (eBPF). In another embodiment, debugging the execution of the application may be performed from an instance not hosting the application.

According to a disclosed embodiment, the operations may further include verifying that the application running in the one or more instances accesses a target service associated with the secret. In another embodiment, the operations may further include decommissioning the secret from within the instance or revoking permissions associated with the secret after the application accesses the target service.

According to a disclosed embodiment, the secret may comply with a just-in-time security policy. In another embodiment, the secret may comply with a least-privilege security policy.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

FIG. 4 is a flowchart depicting an exemplary process for injecting secrets into a software instance environment in accordance with disclosed embodiments.

DETAILED DESCRIPTION

Figure 1:
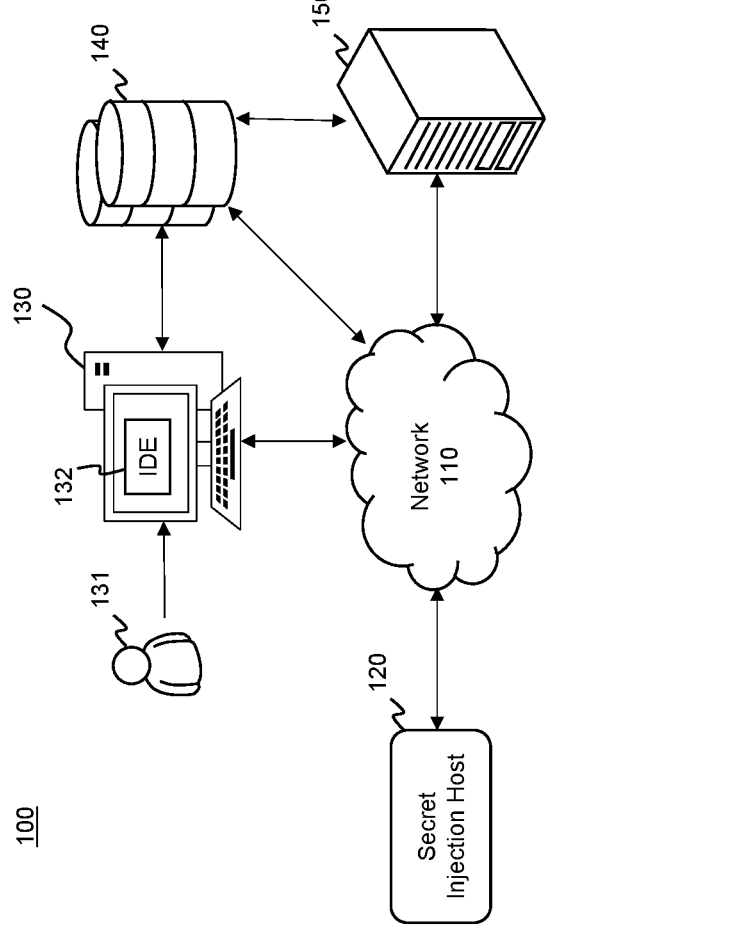
FIG. 1 is a block diagram of an exemplary system for injecting secrets into a software instance environment in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for injecting secrets into a software instance environment described herein overcome several technological problems related to security, efficiency, and functionality in the fields of cybersecurity and software management. In particular, the disclosed embodiments provide techniques for securing software instance environments from malicious attacks. As discussed above, malicious actors may target containers hosting applications and attempt to impersonate legitimate programs to access certain secrets. Existing techniques fail to provide continuous monitoring of applications in cloud-based environments and delivery of secrets into cloud-based or container applications in a secure manner.

The disclosed embodiments provide technical solutions to these and other problems arising from current techniques. For example, disclosed techniques may improve security by reducing or eliminating the need for containers and host applications to contact a secret management server, thus minimizing the chances of success by a malicious actor impersonating the container or the application. Disclosed techniques may further provide monitoring and enforcement of privileged access restrictions or other security policies. Disclosed techniques for injecting secrets based on execution debugging may further be combined with security monitoring and enforcement programs. For these, and other reasons that will be apparent to those skilled in the art, the disclosed techniques provide improved security, performance, and efficiency over existing techniques.

Machine learning algorithms may be employed for the purposes of predicting an execution state of the application corresponding to a determined condition for an application to use a secret. Such algorithms may be trained using training examples or training data sets. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, techniques that train machine learning algorithms may further use validation examples and/or test examples. For example, validation examples and/or test examples may include example inputs together with the desired outputs corresponding to the example inputs. A trained machine learning algorithm and/or an intermediately trained machine learning algorithm may be used to estimate outputs for the example inputs of the validation examples and/or test examples. The estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper-parameters, where the hyper-parameters may be set manually by a person or automatically by a process external to the machine learning algorithm (such as a hyper-parameter search algorithm), and the parameters of the machine learning algorithm may be set by the machine learning algorithm according to the training examples. In some implementations, the hyper-parameters may be set according to the training examples and the validation examples, and the parameters may be set according to the training examples and the selected hyper-parameters. Further, the disclosed techniques may be automated using a trained machine learning algorithm. Such automation improves efficiency by eliminating or reducing the need for user input and increases accuracy and speed of code review beyond the capabilities of a human.

Reference will now be made in detail to the disclosed embodiments, examples of which are illustrated in the accompanying drawings.

FIG. 1 illustrates an exemplary system 100 for injecting secrets into a software instance environment, consistent with the disclosed embodiments. System 100 may represent an environment in which software code is developed and/or executed, for example in a cloud environment. System 100 may include one or more secret injection hosts 120, one or more computing devices 130, one or more databases 140, and one or more servers 150, as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an integrated development environment (IDE) 132 operated on computing device 130. Examples may include FileMaker™, Essential Studio™, Visual LANSA™, GeneXus™, and various others.

System 100 may further comprise one or more database(s) 140, for storing and/or executing software. For example, database 140 may be configured to store software or code, such as code or build scripts developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of subordinate databases, load balancers, dummy servers, firewalls, back-up databases, and/or any other desired database components. In some embodiments, database 140 may be employed as a cloud service, such as a Software as a Service (SaaS) system, a Platform as a Service (PaaS) system, or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vmWare™, or other cloud computing providers. Data sharing platform 140 may also include other commercial file sharing services, such as Dropbox™, Google Docs™, or iCloud™, etc. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the code injection process, for example, by managing communications between computing devices 130 and databases 140 over network 110. Server device 150 may identify code in database 140, may receive updates when new or revised code is entered in database 140, and may participate in injecting secrets into software instance environments as discussed below and in FIGS. 3-4.

Secret injection host 120 may be any device, component, program, script, or the like, for injecting secrets into software instance environments within system 100, as described in more detail below. Secret injection host 120 may be configured to monitor other components within system 100, including computing device 130, integrated development environment 132, database 140, and server 150. In some embodiments, secret injection host 120 may be implemented as a separate component within system 100, capable of retrieving or generating secrets and injecting them into software instance environments running within network 110. In other embodiments, secret injection host 120 may be a program or script and may be executed by another component of system 100 (e.g., integrated into computing device 130, database 140, or server 150).

Figure 2:
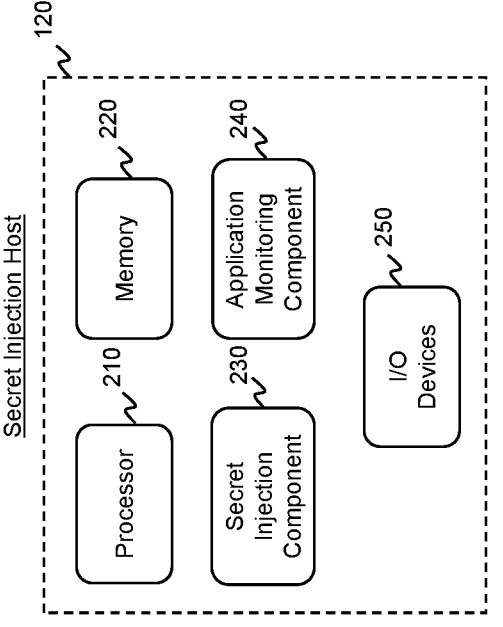
FIG. 2 is a block diagram showing an exemplary secret injection host in accordance with disclosed embodiments.

Secret injection host 120 may comprise additional elements to facilitate analysis of software, code, functions, and/or scripts, and injection of secrets into software instance environments within system 100. FIG. 2 is a block diagram showing an exemplary secret injection host 120 in accordance with disclosed embodiments. For example, secret injection host 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments, secret injection host 120 may be employed as a cloud service, such as a Software as a Service (SaaS) system, a Platform as a Service (PaaS), or Infrastructure as a Service (IaaS) system. For example, secret injection host 120 may be based on infrastructure of services of Amazon Web Services™ (AWS™), Microsoft Azure™, Google Cloud Platform™, Cisco Metapod™, Joyent™, vmWare™, or other cloud computing providers. In an embodiment, secret injection host 120 may be integrated with a host that operates as a node in a cluster, for example, a Kubernetes™ node, and the node may further include software instance environments such as containers. In another embodiment, secret injection host 120 may be a container deployed on a node, or it may be deployed in a layer separate from software containers.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to inject secrets into a software instance from computing device 130, for example, using method 400, as described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Secret injection host 120 may further comprise one or more components for performing various operations of the disclosed embodiments. For example, secret injection host 120 may contain a secret injection component 230 and an application monitoring component 240. Secret injection component 230 may be configured to store, access, or retrieve secrets from a secret management platform or database and inject secrets into a software instance environment within other components or devices within system 100. For example, secret injection component 230 may be configured to access and inspect computing device 130, database 140, or server 150 for secrets and to inject secrets into a software instance environment as discussed below. In some embodiments, secret injection component 230 may also be configured to generate secrets. For example, secret injection component 230 may create secrets on demand (e.g., based on a request for a secret, a prediction of a need or usage of a secret, etc.), based on triggers or prompts from application monitoring component 240. Such secrets may be generated by secret injection component 230 on a just-in-time basis, periodically, manually, or permanently, in various embodiments.

Application monitoring component 240 may be configured to identify code of an application from storage, such as code stored on computing device 130, database 140, or server 150. Application monitoring component 240 may analyze code to determine a secret associated with execution of the application and may monitor the application running in one or more software instances running on computing device 130, database 140, or server 150 to determine a condition for the application to use the secret. Application monitoring component 240 may also validate the condition for the application to use the secret based on an execution state of the application.

Secret injection component 230 and application monitoring component 240 may be separate components of secret injection host 120, for example, with dedicated processors and/or memories. In other embodiments, though shown separately in FIG. 2, secret injection component 230 and application monitoring component 240 may be integrated into a common memory 220 and/or processor 210. For example, secret injection component 230 and/or application monitoring component 240 may be software code, a script, or an application stored on memory 220 and/or executed by processor 210. Further, while secret injection host 120 is shown as having dedicated processor 210 and memory 220, secret injection host 120 itself may be integrated into various other components in system 100. For example, processor 210 and/or memory 220 may be the processor and memory devices of another component in system 100, for example on server 150, database 140, or computing device 130. In such embodiments, secret injection host 120 may be executed as software code, a script, or an application.

Secret injection host 120 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, secret injection host 120 may use a network adaptor to scan for code and code segments within system 100. In some embodiments, the I/O devices 250 may also comprise a touchscreen configured to allow a user to interact with hidden secret detector 120 and/or an associated computing device. The I/O devices 250 may comprise a keyboard, mouse, trackball, touch pad, stylus, and the like. Like processor 210 and memory 220, in embodiments where secret injection host 120 is executed as software or code, I/O devices 250 may be associated with another component of system 100.

Figure 3:
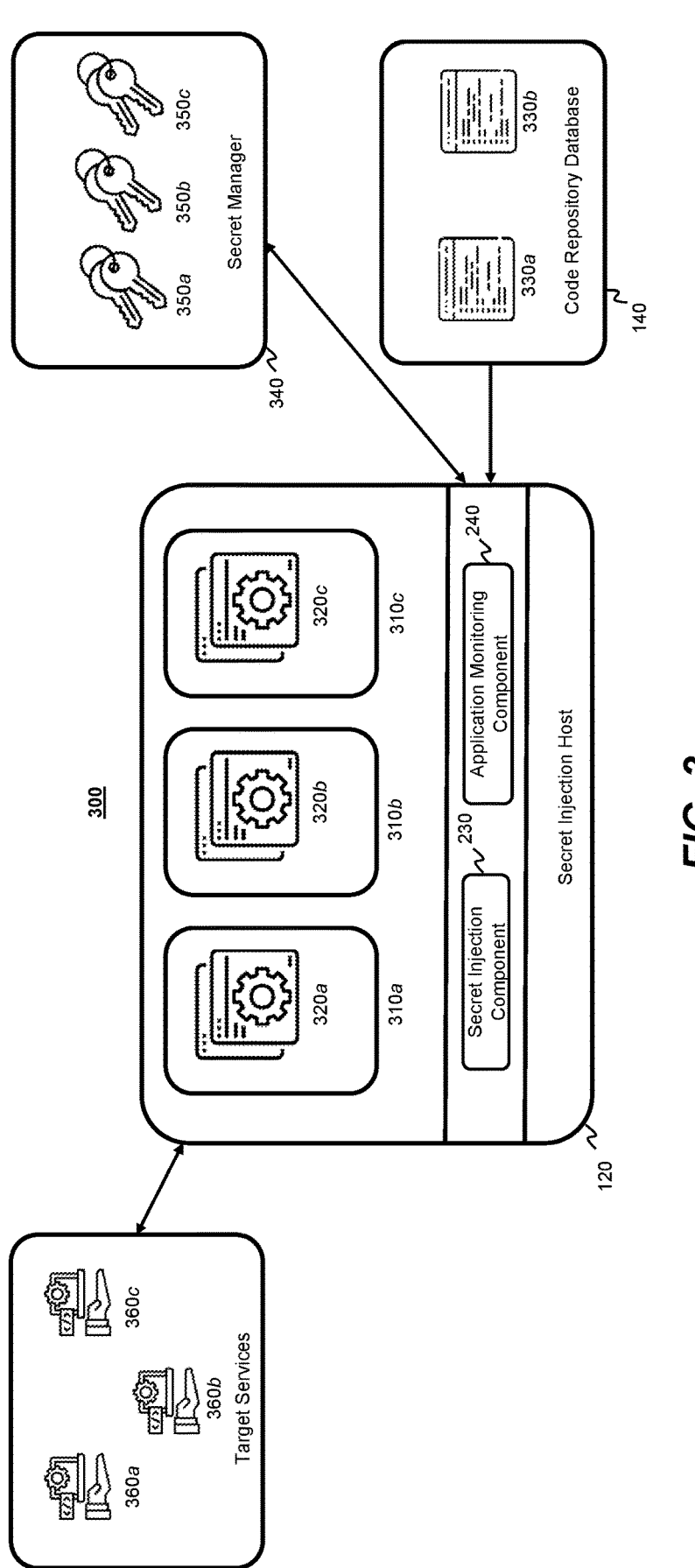
FIG. 3 is a system diagram depicting an exemplary secret injection host operating in a cloud computing environment in accordance with disclosed embodiments.

FIG. 3 is a system diagram depicting an exemplary secret injection host 120 operating in an exemplary cloud computing environment 300. A host in cloud computing environment 300 may be a computing device, such as computing device 130, that provides resources to other devices over a network, such as network 110. A host may enable a number of servers 150 or computing devices 130 to act as one system in which application performance can be guaranteed by multiple machines. A host may employ a network of servers 150 pulling from different databases 140 in different locations. Cloud computing environment 300 may operate on a public cloud, such as e.g., AWS™, Azure™, IBM Cloud™, etc., a private cloud, or a combination of public and private clouds.

Cloud computing environment 300 may include software instances. In an embodiment, a software instance may include one or more containers, though software instances may also run on local or networked machines. A container may be a package of software that contains all the necessary elements to run in any environment. Containers may virtualize an operating system and can run on a plurality of platforms, including a private data center, the public cloud, or a computing device such as computing device 130. Containers may be deployed and managed across private and public cloud infrastructure using container orchestration tools, such as Kubernetes™ and others. Containers may be packages of application code included with dependencies such as specific versions of programming language runtimes and libraries required to run an application. Containers may virtualize a single application and isolate it from other applications or server functions. The embodiment depicted in FIG. 3 includes containers 310*a*, 310*b*, and 310*c*. Though three containers are depicted in the figure, one skilled in the art will appreciate that there may be embodiments with a single container or an unlimited number of containers, because cloud computing environments are designed to scale based on demand. Containers may be grouped into a host for deployment, management, scaling, or discovery.

In an embodiment depicted in FIG. 3, Cloud computing environment 300 may include secret injection host 120, which in turn, may include containers 310*a*, 3106, and 310*c*.

The containers may include software applications, such as applications 320*a*, 320*b*, and 320*c*. An application may be a computer program designed to carry out a specific task. Non-limiting examples of software applications include work processors, media players, accounting applications, presentation software, or spreadsheet software. Though FIG. 3 depicts containers 310*a*, 310*b*, and 310*c* operating inside secret injection host 120, other embodiments may include containers 310*a*, 3106, and 310*c* operating on a different host than secret injection host 120.

Some embodiments may involve software code. Software code may be any form of computer-based code, including software, mobile applications, scripts, web applications, "instant" apps, server-side applications, APIs, embedded code (e.g., in an IoT device, Raspberry Pi, Arduino, etc.), serverless code instances, or any other form of code. Software code may also be written in any suitable programming language, including but not limited to Java, Python, C, Ruby, JavaScript, C#, .NET, PHP, Objective-C, SQL, Go, C++, or various other programming languages. Software code may also implement one or more API actions, for example, based on AWS™ (e.g., Amazon S3™, Amazon EC2™, Amazon Elastic Beanstalk™, AWS PowerShell™, etc.), Google™ (e.g., Google APIs™, Google Analytics™, Youtube™, Ad Exchange™, Google Maps,™ etc.), social media (Twitter™, Facebook™, Linkedin™, Pinterest™, Tumblr™, Instagram™, etc.), or various other APIs. Software code may contain functions which, when executed, cause actions to be performed on applications and/or data within the environment in which it is installed. For example, software code may be installed on one or more devices within system 100 (such as computing device 130, database 140, and/or server 150) and may cause various actions to be performed within system 110. Software may call actions for performing actions on other code segments and on the external environment, which may include accessing, modifying, downloading, moving, deleting, or otherwise manipulating target data, files, applications, code segments, or other target resources.

An embodiment shown in FIG. 3 depicts software code 330*a* and 330*b* stored in database 140. Database 140 may include source control management vendors, such as GitHub™ GitLab™, Bitbucket™, or other source control management vendors. Database 140 may communicate with secret injection host 120 in cloud computing environment 300.

Aspects of the present disclosure may include secrets. A secret may include passwords, user names, Application Programming Interface (API) keys, database credentials, encryption keys, hash values, identity and access management (IAM) permissions, SSH keys, tokens, certificates, biometric data, personal data and other credentials to grant permission to an identity (e.g., user, account, application, agent, virtual instance, etc.). An application may use a secret to access a resource or target service, perform a function, validate a user, or proceed with an execution step. A secret may provide users and applications with access to sensitive data, systems, and services that are otherwise secured or restricted.

In some embodiments, a secret may comply with a just-in-time security policy. A just-in-time security policy may enable users, applications, or systems to have privileged access, only for a limited period of time on an as-needed basis. A just-in-time security policy may grant users, processes, applications, and systems specific rights and access to perform certain tasks for or during a predefined period of time and not before the rights or access is needed.

In some embodiments, a secret may comply with a least-privilege security policy. A least-privilege security policy may give users, applications, or systems limited access rights based on the tasks necessary to do the job (e.g., execute an application, access a resource, perform an action, make a request, etc.). A least-privilege security policy may ensure only authorized users, applications, or systems whose identity has been verified have the necessary permissions to execute jobs within certain systems, applications, data, and other assets, and that no unnecessary or excess privileges or permissions are granted. Accordingly, a least-privilege security policy may include temporal and/or scope limitations on privileges.

Some embodiments may employ a secret manager, such as secret manager 340 depicted in FIG. 3. A secret manager may be a service that protects access to applications, services, and computer resources and may contain secrets. Secret manager 340 may provide secure storage for secrets and other sensitive data in an environment external to the application code. In some embodiments, a developer may include API calls to secret manager 340 which allows the developer to replace the need to include hardcoded secrets in code by using API calls to the secret manager 340. Such techniques improve security because the secret does not exist in the code and may not be accessed by someone examining or otherwise in control of the code. CyberArk's Vault™ and Conjur™ are examples of secret managers. Secret manager 340 may include secrets 350*a*, 350*b*, and 350*c* of the type described herein.

In some embodiments, an application may need to access a target service during its operation. A target service may be a database, library, dependency, secure shell (SSH), or any other resource required by the application. Target services may be secured by one or more secrets. FIG. 3 depicts an embodiment employing target services 360*a*, 360*b*, and 360*c*. In an example case, application 320*a* may call secret manager 340 to obtain secret 350*a*. Application 320*a* may then use secret 350*a* to access target service 360*a*. Applications 3206 and 320*c* may employ similar calls to secret manager 340 to access additional target services. One skilled in the art would appreciate that an application may obtain any number of secrets to access any number of target services, with the quantity of target services and secrets controlled by the size, complexity, and security requirements of the application.

FIG. 4 is a flowchart depicting process 400, an exemplary process for injecting secrets into a software instance environment. Process 400 may be performed, for example, by secret injection host 120, processor 210, secret injection component 230, or application monitoring component 240. Step 410 may include identifying code of an application from storage. Code may contain functions which, when executed, cause actions to be performed on applications and/or data within the environment in which it is installed. For example, code may be installed on one or more devices within system 100 (such as computing device 130, database 140, and/or server 150) and may cause various actions to be performed within system 110. Code may call actions for performing actions on other code segments and on the external environment, which may include accessing, modifying, downloading, moving, deleting, or otherwise manipulating target data, files, applications, code segments, or other target resources in system 100. In an example embodiment, secret injection host 120 may identify code 330*a* from database 140.

In some embodiments, an element of source code may be identified from a repository for source code data, such as GitHub™, GitLab™, Bitbucket™, or other source control management vendors. In other embodiments, an element source code may be identified within system 100, such as from database 140, and/or server 150 or any other internal repository. In further embodiments, an element of source code may be identified through a user device, such as an external hard drive, USB memory device, or any other data storage device. In some embodiments, code may be received in memory, running in an instance, or running in an agent. In other embodiments, identified code may include external files associated with the code, such as configuration files, read-me files, JSON files, XML files, external text files, or any other form of external file.

In other embodiments, code may be stored in a database as part of a dynamic development pipeline. A dynamic development pipeline, or CI/CD pipeline, may refer to a continuous integration, continuous delivery, or continuous deployment environment. For example, CI/CD pipelines may compile incremental code changes made by developers, and then link and package them into software deliverables. Automated tests may verify the software functionality, and automated deployment services may deliver them to end users or other participants in the pipeline. More generally, CI/CD pipelines may refer to any development process that involves continuous development, continuous testing, continuous integration, continuous deployment, and continuous monitoring of software applications throughout a development life cycle. In some embodiments, code may be digitally signed in advance of its integration into the CI/CD pipeline.

At step 420, application monitoring component 240 may analyze the code to determine a secret associated with the execution of the application. A secret associated with the execution of the application may be any secret securing access to a database, cloud environment, or resource required or otherwise used by the application. In other embodiments, a secret associated with the execution of the application may be embedded in the application code and may need to be applied during the execution of the application so the application can proceed to a subsequent execution state. For example, in an embodiment, monitoring component 240 may scan database 140 and identify secrets in the application's source code. Such embedded secrets may be removed from the application when the application moves to a production environment for execution, where secret injection component 230 may inject the missing secret as discussed herein in step 450. In other embodiments, secrets embedded in the application code may be fake, null, or dummy secrets that, in production, are overwritten with valid secrets by secret injection component 230 in step 450.

Application monitoring component 240 may analyze the code to determine a secret associated with the execution of the application in various ways. For example, analyzing the code may include performing a static analysis of the code to identify a secret. Such static analysis may include identifying communication protocols, identifying packages, identifying calls such as API calls or internal resource calls, or identifying file imports. Analyzing the code may also include identifying a method of delivering the secret. For example, a method of delivery of a secret may include input by a user from a user interface, delivery from an external source through an API, accessing a secret embedded in the code itself, or other methods of delivering the secret.

In an embodiment, analyzing the code may include analyzing an environmental variable. An environmental variable may be a dynamic object containing an editable value, for example, an environmental variable may be a configuration file, an import file, a request path or a directory name, or any other editable value. Analyzing an environmental variable may include determining a file path or destination for an application to use a secret, in addition to identifying the value of the secret itself. In another embodiment, analyzing the code to determine a secret associated with the execution of the application may include pre-approving code for execution. Pre-approving code may include granting permissions to certain application states, processes, or calls, and denying permission for all other execution states, processes, or calls.

At step 430, application monitoring component 240 may monitor the application running in one or more instances to determine a condition for the application to use the secret. In an embodiment depicted in FIG. 3, a software instance may run in a container, such as application 320a running in container 310a. Application monitoring component 240 may monitor the application in various ways. In an embodiment, monitoring the application may include debugging at least one line of code associated with the application. Debugging may include running code step by step, or line by line, in a debugging tool. Employing a debugging tool may allow application monitoring component 240 to track the execution state of the application and monitoring changes in computer resources required by the application. Suitable debugging applications may include WinDbg, Visual Studio Debugger, Advanced Debugger, Dragonfly, Parasoft Insure++, and the like. In an embodiment, monitoring the application may include comparing the debugged at least one line of code to pre-approved code. Such comparison may help determine whether the active application has been altered or tampered from its pre-execution code state to its run state. In some embodiments, monitoring the application may include evaluating at least one of metadata associated with the application, power consumption of hardware running the application, network traffic, or memory usage.

In the embodiment show in FIG. 3, monitoring the application may be performed by a host of the one or more software instances. However, the present disclosure is not limited to scenarios where the host monitors the application. In some embodiments, secret injection host 120 or secret injection component 230 and application monitoring component 240 are containers operating in another environment and may access containers operating applications within a common host. In other embodiments, secret injection host 120, secret injection component 230, and application monitoring component 240 access software instances in other hosts. In another embodiment, a debugger for debugging the application is hosted in a virtualized container, and the virtualized container hosting the debugger and the one or more instances running the application are managed by a common instance management platform. In another embodiment, debugging may be performed with an extended Berkeley Packet Filter (eBPF).

Determining a condition for an application to use the secret may include predicting an execution state where the application running in the one or more instances can or needs to use the secret. In other words, application monitoring component 240 may determine the execution state of the application where a secret is required to access a resource or continue execution of the application. Predicting the execution state may be determined by review of the application code using, e.g., a debugger. In other embodiments, machine learning algorithms may be employed to determine a condition for the application to use the secret.

Step 440 of process 400 may include validating the condition for the application to use the secret based on an execution state of the application. Validating the condition for the application to use the secret may include checking that the application satisfies expectations for the condition to use the secret determined in step 430. Validating the condition may include dynamic analysis of the application's inputs and outputs and comparing those inputs and outputs to the condition of the application identified in step 430. In some embodiments validating the condition may include analyzing one or more lines of code associated with the execution state of the application. In other embodiments, validating the condition may include analyzing one or more lines of code associated with a subsequent execution state of the application. For example, application 320a may require secret 350a to access target service 360a. Validating the condition for the application to use the secret may include confirming that application 320a is at the execution state where a call to target service 360a is required.

At step 450, process 400 may include injecting the secret into the one or more instances, wherein the application can then access the secret and perform an operation using the secret in accordance with the determined condition. Injecting the secret into one or more instances may be performed by secret injection component 230. Injecting the secret into the one or more instances may include providing the secret to the software instance through the introduction of new code into the instance. Injecting may include providing a secret to an application in a way to enable the application to use the secret. Injecting the secret may also provide the secret in the way that the application needs to implement the secret. For example, if the application requires a certain environmental variable, such as a file path, to use the secret, the system may provide the secret in accordance with the file path. In an embodiment, injecting the secret may include providing the secret based on an environmental variable, may include at least one of a configuration file, an import file, or a request path.

As discussed above, the secret may be injected in accordance with a just-in-time policy. Further, as explained above, the secret may be injected based on a least-privilege policy. Some embodiments may adhere to both just-in-time and least-privilege security policies.

In other embodiments, injecting the secret into the one or more instances may include identifying a type and a consumption method of the secret by the application, and may further include injecting the secret in accordance with the type and the consumption method. For example, a type may be a classification or category of secrets (e.g., tokens, passwords, hashes, keys, etc.). A consumption method may be how the secret is injected into the instance (e.g., stored in instance memory, shared memory, etc.), how the secret is asserted by the instance (e.g., as part of a request, as part of a command, as part of a response to a request, etc.), how often the secret is used (e.g., on-demand, periodically, persistently, etc.), how the secret is validated (e.g., by the target resource itself, by an agent of the target resource, by a separate validation service, etc.), or other types of consumption.

In some embodiments, injecting the secret into an instance may include obtaining the secret from a secure location, such as secret manager 340, before injecting the secret into one or more software instances. Secret injection host 120 may obtain the secret from the secret manager 340, eliminating the need for the application to place a call to the secret manager 340. In other embodiments, secret injection component 230 may generate secrets. For example, secret injection component 230 may create secrets on demand (e.g., based on a request for a secret, a prediction of a need or usage of a secret, etc.), based on triggers or prompts from application monitoring component 240. Such secrets may be generated by secret injection component 230 on a just-in-time basis, periodically, manually, or permanently, in various embodiments. Eliminating the need for an application to place a call to a secret manager improves security because it prevents a compromised software container from accessing the secret manager and obtaining secrets that could be utilized for performing unauthorized actions.

In embodiments where the secret is hardcoded into the application code, injecting the secret into an instance may include removing the secret from the application and replacing it with a dummy variable, which may secure the code. The system may then provide the previously hardcoded secret to the application at the appropriate execution state to use the secret when needed.

In some embodiments, process 400 may include verifying that the application running in the one or more instances used the secret according to the pre-approved code. For example, application monitoring component 240 may continue to monitor the execution state of the application to verify that the application employed the code to access the correct target service. In other embodiments, secret injection host 120 may confirm with the target service that the application accessed the target service associated with the secret.

Subsequent security methods for decommissioning an injected secret may be employed after the application uses the secret. For example, secret injection host 120 may remove the secret from the one or more instances after the application accesses the secret. In another embodiment, secret injection host 120 may revoke a permission associated with the secret after the application running in the one or more instances uses the secret.

Identification and injection of secrets into software instances may be further improved by comparing current code versions to older code versions that are known to be secure. For example, in an embodiment, process 400 may also include accessing a previous version of the application from storage, identifying a change to the application compared to the previous version of the application, and analyzing the change to the application to validate the condition for the application to use the secret. Such techniques serve to identify changes to the application execution state or secret source that may indicate the software instance has been compromised by a malicious actor.

The described computer readable media, systems, and methods employ novel and unconventional solutions to overcome problems in the art. Disclosed solutions may enable on-scale and automatic debugging of source code in a production environment. Solutions may also improve the connection between, on the one hand, the DevOps pipeline and the code repository at the source, and on the other hand the real-time validation of what is running on the production side. Solutions may also make secrets available for the code of the application in a secure, automatic, real-time, and transparent way, enable the connection of the injected secrets to a secret vault solution where the secrets are managed and created, and enable "Just In Time" and "Just Enough Administration" options available for implementation and enforcement.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A computer-implemented method for injecting secrets into a software instance environment, comprising:
   identifying, from storage, code of an application;
   analyzing the code to determine a secret associated with execution of the application;
   executing the application in one or more software instances;
   monitoring execution of the application in the one or more software instances;
   determining a condition for the application to use the secret;
   validating the condition for the application to use the secret based on an execution state of the application; and
   injecting the secret into the one or more software instances to enable the application to access the secret and perform an operation using the secret during the execution in accordance with the determined condition.

2. The computer-implemented method of claim 1, wherein analyzing the code to determine the secret associated with the application includes identifying a call associated with the secret.

3. The computer-implemented method of claim 1, wherein analyzing the code to determine the secret associated with the application includes identifying a method of delivering the secret.

4. The computer-implemented method of claim 1, wherein analyzing the code to determine the secret associated with the application includes analyzing an environmental variable.

5. The computer-implemented method of claim 1, wherein analyzing the code to determine the secret associated with the application includes pre-approving code for execution.

6. The computer-implemented method of claim 1, wherein monitoring the application includes debugging at least one line of code associated with the application.

7. The computer-implemented method of claim 6, wherein monitoring the application further includes comparing the debugged at least one line of code to pre-approved code.

8. The computer-implemented method of claim 6, wherein the debugging is performed by a host of the one or more software instances.

9. The computer-implemented method of claim 6, wherein the debugging is performed with an extended Berkeley Packet Filter (eBPF).

10. The computer-implemented method of claim 1, wherein monitoring the application further includes evaluating at least one of metadata associated with the application, the power consumption of hardware running the application, the network traffic, or the memory usage.

11. The computer-implemented method of claim 1, wherein monitoring the application further includes employing a machine learning algorithm to predict the execution state of the application corresponding to the determined condition.

12. The computer-implemented method of claim 1, wherein determining the condition for the application to use the secret includes predicting an execution state where the application can use the secret.

13. The computer-implemented method of claim 1, wherein validating the condition for the application to use the secret includes analyzing one or more lines of code associated with the execution state of the application.

14. The computer-implemented method of claim 1, wherein validating the condition for the application to use the secret includes analyzing one or more lines of code associated with a subsequent execution state of the application.

15. The computer-implemented method of claim 1, further comprising retrieving the secret from a secure location before injecting the secret into the one or more software instances.

16. The computer-implemented method of claim 1, wherein injecting the secret includes providing the secret based on an environmental variable.

17. The computer-implemented method of claim 16, wherein the environmental variable includes at least one of a configuration file, an import file, or a request path.

18. The computer-implemented method of claim 1, wherein injecting the secret includes replacing a dummy secret embedded in the application with a valid secret.

19. The computer-implemented method of claim 1, wherein injecting the secret further includes identifying a type and a consumption method of the secret by the application and injecting the secret in accordance with the type and the consumption method.

20. The computer-implemented method of claim 5, further comprising verifying that the application used the secret according to the pre-approved code.

21. The computer-implemented method of claim 1, further comprising removing the secret from the one or more software instances after the application accesses the secret.

22. The computer-implemented method of claim 1, further comprising revoking a permission associated with the secret after the application uses the secret.

23. The computer-implemented method of claim 1, wherein the application is stored in a database in a continuous integration/continuous delivery (CI/CD) pipeline.

24. The computer-implemented method of claim 23, wherein the application is digitally signed in advance of being integrated into the CI/CD pipeline.

25. The computer-implemented method of claim 6, wherein:

a debugger for debugging the application is hosted in a virtualized container; and the virtualized container hosting the debugger and the one or more software instances are managed by a common instance management platform.

26. A non-transitory computer-readable medium including instructions that, when executed by at least one processor, cause the at least one processor to perform operations for injecting secrets into a software instance environment, the operations comprising:

identifying, from storage, code of an application;

analyzing the code to determine a secret associated with execution of the application;

executing the application in one or more software instances;

monitoring execution of the application in the one or more software instances;

determining a condition for the application to use the secret;

validating the condition for the application to use the secret based on an execution state of the application; and injecting the secret into the one or more software instances to enable the application to access the secret and perform an operation using the secret during the execution in accordance with the determined condition.

27. The computer-readable medium of claim 26, wherein:

analyzing the code includes pre-approving code for execution, and validating the condition for the application to use the secret includes comparing the execution state of the application to the pre-approved code.

28. The computer-readable medium of claim 26, wherein the operations further comprise:

accessing a previous version of the application from storage; and identifying a change to the application compared to the previous version of the application;

wherein validating the condition for the application to use the secret includes analyzing the change to the application.

29. The computer-readable medium of claim 26, wherein the operations further comprise debugging the execution of the application, and wherein debugging is performed from a host of the software instance or in a layer of an extended Berkeley Packet Filter (eBPF).

30. The computer-readable medium of claim 26, wherein the operations further comprise debugging the execution of the application, and wherein debugging is performed from a software instance not hosting the application.

31. The computer-readable medium of claim 26, wherein the operations further comprise verifying that the application accesses a target service associated with the secret.

32. The computer-readable medium of claim 31, wherein the operations further comprise:

decommissioning the secret from within the one or more software instances or revoking permissions associated with the secret after the application accesses the target service.

33. The computer-readable medium of claim 26, wherein the secret complies with a just-in-time security policy.

34. The computer-readable medium of claim 26, wherein the secret complies with a least-privilege security policy.

* * * * *